(12) United States Patent
Glejbøl

(10) Patent No.: US 12,553,409 B2
(45) Date of Patent: Feb. 17, 2026

(54) WAVE POWER SYSTEM

(71) Applicant: Wavepiston A/S, Helsingør (DK)

(72) Inventor: Kristian Glejbøl, Glostrup (DK)

(73) Assignee: WAVEPISTON A/S, Helsingør (DK)

( * ) Notice: Subject to any disclaimer, the term of this patent is extended or adjusted under 35 U.S.C. 154(b) by 0 days.

(21) Appl. No.: 18/285,916

(22) PCT Filed: Apr. 7, 2022

(86) PCT No.: PCT/DK2022/050072
§ 371 (c)(1),
(2) Date: Oct. 6, 2023

(87) PCT Pub. No.: WO2022/214153
PCT Pub. Date: Oct. 13, 2022

(65) Prior Publication Data
US 2024/0392740 A1 Nov. 28, 2024

(30) Foreign Application Priority Data
Apr. 8, 2021 (DK) .......................... PA 2021 70164

(51) Int. Cl.
*F03B 13/18* (2006.01)
(52) U.S. Cl.
CPC ........ *F03B 13/185* (2013.01); *F05B 2270/18* (2013.01)
(58) Field of Classification Search
CPC ..... F03B 13/185; F05B 2270/18; Y02E 10/30
See application file for complete search history.

(56) References Cited

U.S. PATENT DOCUMENTS

| 870,706 | A |   | 11/1907 | Woodward |
| 875,950 | A |   | 1/1908 | Reynolds |
| 901,117 | A | * | 10/1908 | Mcmanus ............... F02B 63/04 290/40 R |
| 1,078,323 | A | * | 11/1913 | Trull ...................... F03C 99/00 417/61 |

(Continued)

FOREIGN PATENT DOCUMENTS

| IT | 20163245 A1 | 7/2016 |
| JP | S58113583 A | 7/1983 |

(Continued)

OTHER PUBLICATIONS

International Preliminary Report on Patentability received for PCT Patent Application No. PCT/DK2022/050072, mailed on Oct. 19, 2023, 9 pages.

(Continued)

*Primary Examiner* — Pedro J Cuevas
(74) *Attorney, Agent, or Firm* — Boone IP Law

(57) ABSTRACT

Herein is disclosed a wave power system for extracting energy from water waves. The wave power system includes a basic structure, at least one effector movably engaged with the basic structure and adapted for being moved relative to the basic structure by water waves, and an energy harvesting arrangement arranged for harvesting energy from the relative movements between the energy collector and the basic structure The basic structure is a plurality of duct sections releasable connected to each other. Conveniently, the wave power system includes several effectors.

26 Claims, 11 Drawing Sheets

(56) References Cited

U.S. PATENT DOCUMENTS

| | | | | |
|---|---|---|---|---|
| 2,828,024 | A * | 3/1958 | True | E21B 19/14 414/22.51 |
| 3,111,692 | A * | 11/1963 | Cox | E21B 43/01 137/236.1 |
| 3,612,177 | A * | 10/1971 | Gassett | E21B 41/08 166/344 |
| 3,758,788 | A * | 9/1973 | Richeson | F03B 13/20 290/1 R |
| 3,961,863 | A * | 6/1976 | Hooper, III | F04B 43/086 92/39 |
| 4,077,213 | A * | 3/1978 | Hagen | F03B 13/20 60/501 |
| 4,098,084 | A * | 7/1978 | Cockerell | F03B 13/20 60/501 |
| 4,210,821 | A * | 7/1980 | Cockerell | F03B 13/20 290/54 |
| 4,249,084 | A | 2/1981 | Villanueva et al. | |
| 4,341,074 | A * | 7/1982 | French | F03B 13/20 60/500 |
| 4,408,454 | A * | 10/1983 | Hagen | F03B 13/1815 60/497 |
| 4,408,455 | A | 10/1983 | Montgomery | |
| 4,495,765 | A * | 1/1985 | French | F03B 13/20 60/504 |
| 4,684,815 | A * | 8/1987 | Gargos | F03B 13/20 60/501 |
| 4,686,377 | A * | 8/1987 | Gargos | F03B 13/20 417/332 |
| 4,698,969 | A | 10/1987 | Raichlen et al. | |
| 4,931,662 | A | 6/1990 | Burton | |
| 5,347,186 | A | 9/1994 | Konotchick | |
| 5,471,739 | A | 12/1995 | Fetzer | |
| 6,476,511 | B1 * | 11/2002 | Yemm | F03B 13/20 290/53 |
| 7,443,045 | B2 * | 10/2008 | Yemm | F03B 13/20 290/53 |
| 7,921,919 | B2 * | 4/2011 | Horton, III | E21B 33/035 166/368 |
| 7,964,977 | B2 * | 6/2011 | Nair | H10N 35/101 290/53 |
| 8,008,792 | B2 * | 8/2011 | Gray | F03B 13/20 290/53 |
| 8,304,925 | B2 * | 11/2012 | Yang | F03B 13/20 290/53 |
| 8,358,025 | B2 * | 1/2013 | Hogmoe | F03B 13/20 290/53 |
| 8,378,513 | B2 * | 2/2013 | Nair | H02N 2/18 290/53 |
| 8,484,965 | B2 * | 7/2013 | Von Bulow | F03B 13/185 60/495 |
| 8,671,675 | B2 * | 3/2014 | Cuong | F03B 13/20 60/507 |
| 8,806,865 | B2 * | 8/2014 | Dunn | F03B 13/20 60/501 |
| 8,878,381 | B2 * | 11/2014 | Henry | F03D 9/008 290/53 |
| 8,912,678 | B2 * | 12/2014 | Nozawa | F03B 13/186 60/507 |
| 9,018,779 | B2 * | 4/2015 | Yemm | F03B 13/20 290/53 |
| 9,115,689 | B2 * | 8/2015 | Malligere | F03B 13/20 |
| 9,523,346 | B2 * | 12/2016 | Findlay | F03B 13/1815 |
| 9,963,205 | B2 * | 5/2018 | Bauduin | B63B 35/44 |
| 10,352,290 | B2 * | 7/2019 | Kang | F03B 13/1845 |
| 10,359,023 | B2 * | 7/2019 | Murtha, Jr. | F03G 7/08 |
| 10,533,531 | B2 * | 1/2020 | Vamvas | H02K 7/1823 |
| 10,947,951 | B2 * | 3/2021 | Vamvas | H02K 7/1823 |
| 11,333,124 | B2 * | 5/2022 | von Bülow | F03B 13/18 |
| 11,480,147 | B2 * | 10/2022 | Vamvas | H02S 10/10 |
| 11,952,974 | B2 * | 4/2024 | Lenee-Bluhm | F03B 13/22 |
| 12,055,121 | B2 * | 8/2024 | Borigas | F03B 13/20 |
| 2007/0257491 | A1 | 11/2007 | Kornbluh et al. | |
| 2010/0026000 | A1 * | 2/2010 | Hogmoe | F03B 13/20 290/53 |
| 2010/0038913 | A1 * | 2/2010 | Svelund | F03B 13/20 700/287 |
| 2010/0320291 | A1 * | 12/2010 | Chen | A01G 27/005 138/111 |
| 2011/0204643 | A1 * | 8/2011 | Von Bulow | F03B 13/185 60/497 |
| 2014/0265339 | A1 | 9/2014 | Dehlsen | |
| 2016/0185428 | A1 * | 6/2016 | Bauduin | B63B 35/44 441/3 |
| 2018/0372061 | A1 * | 12/2018 | Vamvas | F03B 13/20 |
| 2020/0088155 | A1 * | 3/2020 | von Bülow | F03B 13/18 |
| 2020/0109694 | A1 * | 4/2020 | Vamvas | H02K 7/1823 |
| 2021/0285415 | A1 * | 9/2021 | Vamvas | B63B 35/44 |
| 2023/0167797 | A1 * | 6/2023 | Vamvas | B63B 35/44 290/53 |
| 2024/0392740 | A1 * | 11/2024 | Glejbøl | F03B 13/185 |
| 2024/0401556 | A1 * | 12/2024 | Glejbøl | F03B 13/187 |

FOREIGN PATENT DOCUMENTS

| | | |
|---|---|---|
| WO | 96/02748 A1 | 2/1996 |
| WO | 2006/106184 A1 | 10/2006 |
| WO | 2018/108220 A1 | 6/2018 |
| WO | 2020/257909 A1 | 12/2020 |

OTHER PUBLICATIONS

International Search Report and Written Opinion received for PCT Patent Application No. PCT/DK2022/050072, mailed on Jun. 3, 2022, 11 pages.

Office Action received for Denmark Patent Application No. PA202170164, mailed on Sep. 10, 2021, 7 pages.

Extended European Search Report for Application No. 22784181.4 dated Mar. 7, 2025, 9 pages.

* cited by examiner

WAVE POWER SYSTEM

TECHNICAL FIELD

The invention relates to a wave power system for extracting energy from water waves, such as surface water waves e.g. in waters such as oceans, lakes or any other waters where water surface waves are generated by wind or other environmental influences.

BACKGROUND ART

For many years, there has been high focus on environment friendly methods for generating energy, in particular by extracting energy from sun, wind and water waves.

Many different systems for extracting energy from water waves have been suggested. US 2007/0257491 discloses a wave power system comprising a plurality of generators comprising a float and a brake and a mechanical energy transmission system that harnesses wave energy and converts it into limited motion that is suitable for input to an electrical energy generator.

WO20257909 describes a wave energy harnessing system comprising a plurality of wave energy devices coupled together, to form a high capacity installation. The wave energy device includes a buoyant body, which maintains a permanent orientation relative to the surface of the ocean, while the power take-off (PTO) would self-align in the direction of the incoming waves. The power take-off is completely enclosed, above the waterline and easily accessible. The buoyant body is coupled to the buoyant bodies of other similar wave energy devices by flexible or articulating coupling means. The wave energy devices are arranged in arrays or any other suitable layouts, to form large connected floating structures.

US2020088155 discloses a wave power device for extracting energy from water waves. The wave power device comprise a reference structure and effectors moving relative to the reference structure. Each effector is connected to two hydraulic rams, symmetrically positioned around each effector. The hydraulic rams have an effective hydraulic area which is stepwise increased as the length of the hydraulic rams are compressed and stepwise decreased as the length of the hydraulic rams are increased.

A particular challenge for such wave power systems is that they are subjected to harsh environment in the water e.g. ocean water, both in respect of chemical and mechanical influences on the system. Violent storms are frequent, and aerated seawater is highly corrosive. Cost of installation may also be a challenge.

DISCLOSURE OF INVENTION

An objective of the present invention is to provide a wave power system, which may be installed at appropriate and attractive cost.

In an embodiment, it is an objective to provide a wave power system, which is relatively simple to install and maintain operable.

In an embodiment, it is an objective to provide a wave power system, in which defective parts may be replaced in a relatively simple way and at a corresponding relatively low cost.

In an embodiment, it is an objective to provide a wave power system, which is relatively robust and effective for harvesting wave energy.

In an embodiment, it is an objective to provide a wave power system, which is scalable and where it is relatively simple to increase or reduce the output of the wave power system even after a first installation.

These and other objects have been solved by the inventions or embodiments thereof as defined in the claims and as described herein below.

It has been found that the inventions or embodiments thereof have a number of additional advantages, which will be clear to the skilled person from the following description and claims.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

Reference made to "some embodiments" or "an embodiment" means that a particular feature(s), structure(s), or characteristic(s) described in connection with such embodiment(s) is included in at least one embodiment of the subject matter disclosed. Thus, the appearance of the phrases "in some embodiments" or "in an embodiment" in various places throughout the specification is not necessarily referring to the same embodiment(s). Further, the skilled person will understand that particular features, structures, or characteristics may be combined in any suitable manner within the scope of the invention as defined by the claims.

The term "substantially" should unless otherwise specified or clear from the context, be taken to mean that ordinary product variances and tolerances are comprised.

Throughout the description or claims, the singular encompasses the plural unless otherwise specified or required by the context.

All features of the invention and embodiments of the invention as described herein, including ranges and preferred ranges, may be combined in various ways within the scope of the invention, unless there are specific reasons not to combine such features.

The wave power system of the invention provides a desirable robust system for extracting energy from water waves, which system may be installed in a relatively simple manner as it will be explained further herein.

The wave power system comprises
a basic structure,
at least one effector movably engaged with the basic structure and adapted for being moved relative to the basic structure by water waves, and
an energy harvesting arrangement arranged for harvesting energy from the relative movements between the energy collector and the basic structure.

The basic structure may in an embodiment be referred to as a substantially stationary member. The term "substantially stationary member" means that the member in use is mounted to remain substantially stationary when the effector(s) moves relatively thereto.

The basic structure comprises a plurality of duct sections, which are releasably connected to each other.

The basic structure may form the framework or skeleton of the wave power system. By providing the basic structure of an assembly of duct sections a very robust basic structure may be provided in a relatively simple way. To provide a very effective energy harvesting system the basic structure may be relative long, such as 50 m or longer, such as 100 m or longer or even several hundreds meters. By providing the basic structure in form of an assembly of a number of duct sections, the elements for the basic structure may be transported to the site of installment in unassembled state and the duct sections may be assembled during the installation. Thereby the installation becomes both relatively low cost and relatively simple and at the same time a very robust wave power system may be provided.

For easy assembling, the duct sections may advantageously be prepared for assembling end to end. The duct sections may preferably be interconnected by respective male end portions and female end portions mated to each other. Thereby during the assembling, it may be relatively simple for the craftsman to mate a female end of one duct section to a male end of another duct section.

In an embodiment, each of the plurality of duct sections has a first and a second end portion. Each first and each second end portion of each of the duct sections is a male end portion or a female end portion. Thereby each male end portion of a duct section may be mated with a female end portion of another duct section or to a terminating arrangement.

The terminating arrangement(s) will be described further below. Generally, it is desired that the basic structure comprises at least one terminating arrangement and preferably at least two terminating arrangements, wherein one or more of the terminating arrangements may be shared with one or more other basic structures.

Conveniently, each of the plurality of duct sections comprises a male end portion and a female end portion, two female end portions or two male end portions.

The duct sections are releasable connected in any suitable way, which preferably may be relatively simple to connect and de-connect, while at the same time provide a strong and durable connection.

In an embodiment, the duct sections are releasable connected to each other by clamps.

Examples of suitable clamps may be the clamp connector described in U.S. Pat. No. 5,471,739 and/or a connector of the clamp connector type Grayloc®.

In an embodiment, the male end portions and the female end portions are releasably connected to each other by screw threads. Thereby a very strong and simple to operate connection may be provided. Advantageously, the respective male end portions and female end portions are threaded with mating treads for ensuring an effective connection. The threads may be single start threads or multi start threads. To ensure that the threaded end portions has a desired high strength the duct wall thickness may be increased at the end portions relative to the remaining length section of the duct sections.

In an embodiment, the respective male end portions and female end portions comprises a threaded section, wherein the respective duct sections have a maximum wall thickness at the threaded sections of the end portions, which is larger than the average thickness of the respective duct sections. The maximum wall thickness at a threaded section is determined as the major wall thickness determined at the thickest part of the thread The respective male end portions and female end portions of the respective duct sections may comprise a threaded section, wherein the respective duct sections have a minimum wall thickness at the threaded sections of the end portions, which is equal to or larger than the average thickness of the respective duct sections. The minimum wall thickness of the threaded section is determined as a minimum wall thickness at the depth of a thread.

The threaded female end portions and male end portions are also called singles, i.e. a single may be a threaded female end portion or a threaded male end portion.

It has been found that the duct sections beneficially are of the type known as drill pipes, such as drill pipes according to the standard API 5DP. Hence, in an embodiment one or more of the duct sections are drill pipes according to API 5DP, wherein preferably at least a number of the drill pipes are modified to have an inlet opening e.g. to form inlet duct sections.

In an embodiment, the basic structure is a load bearing structure.

In an embodiment, the basic structure is a substantially stationary member.

The duct sections may be produced from any material having a desired mechanical and chemical strength. Advantageously, duct sections are made from steel, aluminum, titanium, fibre composite or any combination comprising one or more of these. The fibre composite material may advantageously comprise a fibre-reinforced polymer comprising a cross-linked and/or a thermoset polymer, such as a cross-linked polyolefin and/or epoxy resin.

Examples of suitable fibres of the fibre reinforced polymer includes fibres selected from glass fibres, basalt fibres, polypropylene fibres, carbon fibres, glass fibres, aramide fibres, steel fibres, polyethylene fibres, mineral fibres and/or mixtures comprising at least one of the foregoing fibres.

The fibre reinforced polymer advantageously comprise at least about 10% by weight of fibres, such as from about 20% to about 80% by weight of fibres.

Advantageous the material of the duct sections has a young's modulus of at least about 0.7 GPa, such as at least about 1 GPa, such as at least about 10 GPa. Where the layer of material is a metal, it may be desired that the metal has a young's modulus of at least about 10 GPa, such as at least about 100 GPa, such as at least about 190 GPa, such as at least about 200 GPa.

To ensure a desired location of the wave power system relative to the water surface, the wave power system may advantageously comprise a plurality of buoyancy elements. The desired number and buoyancy effect of the buoyancy elements depends largely on the number and weight of the duct sections.

The buoyancy elements may be arranged for holding the basic structure at a desired buoyancy state relative to water surface for optimal harvesting of energy from the water waves.

Advantageously, the buoyancy elements are arranged for making the structure partly for fully buoyant.

The buoyancy elements may be adjustable. In an embodiment, the buoyancy elements are located such that a plurality of the duct sections is attached to one or more of the buoyancy elements, for example each main duct sections may be attached to a buoyancy element. This ensures that the basic structure may be held at a desired level relative to the water surface.

During deployment, e.g. module by module, the duct sections forming the basic structure are advantageously nearly neutral buoyant such that when air filled the buoyancy elements may advantageously be adjusted to hold the basic structure floating at water level and such that once the duct sections of the basic structure is fully or partly filled with water it will sink below water level.

Due to the almost neutral buoyancy of the basic structure, it will be relatively easy to couple to the effectors that have a slight buoyancy and thus keeps the whole system near the water surface, preferably such that the effectors are fully below water.

In principle, the effectors may be arranged for being moved in any directions by the water.

Water wave's displacement and frequency are often inconsistent and unpredictable. Generally, a water particle in a rolling wave travels in a circular or elliptical pattern, which comprises a vertical component and a horizontal component.

The effector may be adapted for being moved by a horizontal component of the water waves and/or by a vertical component of the water waves (rise and fall of the water).

Advantageously, effectors are movably engaged with the basic structure by being connected to the basic structure via transmission arrangement(s), for example each effector may be connected to the basic structure via one or more, such as one or two transmission arrangements.

Each effector may advantageously comprise an effector flange with two opposite surfaces for effectively being impacted by the water waves for the movements relative to the basic structure.

The effector flange may advantageously be held in a substantially perpendicular orientation relative to the basic structure i.e. such that one or both of the surfaces of the effector flange is substantially perpendicular to at least one duct sections, such as preferably a duct section to which the effector is connected via the transmission arrangement. The effector may in an embodiment be mounted such that it may rotate fully or partly around its associated duct section.

In an embodiment, the effector is mounted such that that the effector flange may be flapping by impact of the water waves such that the effector flange may flap between a perpendicular orientation relative to the basic structure and up to 30 degrees, such as up to 20 degrees, such as up to 10 degrees relative to a center axis of its associated duct section.

The energy harvesting arrangement may be configured for converting the energy to electricity, heat or pressurized fluid or a combination thereof.

In an embodiment, the energy harvesting arrangement may be configured for converting the main part of energy to electricity and a smaller part of the energy is converted to mechanical energy for stabilizing the operation of the wave power system.

The energy harvesting arrangement may conveniently comprise a generator for generating electricity, heat and/or pressurized fluid.

In an embodiment, the energy harvesting arrangement comprises a generator mechanically coupled to the least one effector for harvesting kinetic energy from the relative movements between the effector and the basic structure. The mechanical coupling may for example be arranged to drive a wheel or similar.

In an embodiment, the energy harvesting arrangement comprises a coil generator comprising an electrical conducting coil and the effector comprises a magnet and the coil of the coil generator is located to generate electrical power by movement of the magnet by the relative movement between the effector and the basic structure. Generating of electricity by moving a magnet relative to an electrical conducting coil is well known from the windmill technology.

or

In an embodiment, the energy harvesting arrangement comprises a turbine generator comprising a hydraulic turbine and the energy harvesting arrangement comprises a transmission arrangement arranged for pumping fluid to drive the hydraulic turbine, wherein the transmission arrangement is located to generate pump power for pumping fluid by the relative movement between the effector and the basic structure.

Advantageously, the plurality of duct sections comprises a plurality of straight duct sections. In an embodiment, the duct sections may comprise one or more intermediate angular duct sections.

As mentioned above the basic structure may be relatively long for allowing a desired high extracting of energy, for example for allowing a relative long travelling length of the respective effectors relative to and along the length of the basic structure.

In principle, the plurality of duct sections may have equal or different lengths. However, for easy transport and assembly at the installation site, it is desired that the duct sections have a length of up to about 30 m, such as up to about 15 m, such as up to about 10 m. Some of the duct sections may be relatively long and other may be relatively short, such a 5 m or shorter.

In an embodiment, the plurality of duct sections comprises main duct sections and intermediate duct sections, wherein the intermediate duct sections has lengths which are 50% or less of the longest of the main duct sections, preferably the intermediate length sections have a length of from about 15 cm to about 2 m, such as from about 0.2 to about 1 m.

By having a combination, which comprises main duct sections and intermediate duct sections, the main duct sections may provide the desired length and the intermediate duct sections may be applied between main duct sections, which thereby makes the assembling and installation even simpler.

As mentioned for an effective energy extraction it is desired that the wave power system comprises a plurality of effectors, such as at least three effectors, such as at least 5 effectors, such as at least 10 effectors or even more.

In an embodiment, the wave power system comprises a least three effectors wherein each effector is associated to a respective one of the duct sections for being moved parallel to the associated duct section, wherein the associated duct section preferably is a straight duct section.

The expression that an effector is associated to a duct section or a duct section assembly is used to mean that the effector is configured to being moved parallel to the associated duct section from a center position to a first end position and back to the center position and from the center position to a second opposite end position and back to the center position. The travelling length is the distance between the first end position and the second opposite end position.

Advantageously, a number of the duct sections are inlet duct sections and comprises an inlet opening into the bore of the duct wherein the inlet opening is in fluidic communication with a transmission arrangement adapted for transmitting the relative movement of the effector(s) to pumping of water into the bore of the respective inlet duct sections via the respective inlets.

One or more of the inlet duct sections may be main duct sections as described above.

One or more of the inlet duct sections may be intermediate duct sections as described above.

In an embodiment, a plurality of the inlet duct sections are intermediate duct sections located between main duct sections.

The basic structure may comprise a plurality of the duct sections connected in extension of each other to form a row of duct sections, comprising main duct sections with respective associated effectors arranged for being moved lengthwise relative to respective associated main duct sections. The respective effectors may conveniently be connected with respective transmission arrangements for transmitting the relative movement of the effector(s) to pumping of water into the bore of the row of duct sections.

The transmission arrangements may for example be as described in US2020088155 e.g. comprising one or more hydraulic rams, an and optionally an effector frame and/or a rigid metal frame for stabilizing the effector, wherein the effector frame and/or a rigid metal frame may be wheeled.

In an embodiment, the wave power system is as the wave power device described in US2020088155 with the modification that the substantially stationary member as described in US2020088155 is replaced by a basic structure as disclosed herein.

In an embodiment, the wave power system is as the wave power device described in US2020088155 with the modification that the pressure pipe(s) as described in US2020088155 is replaced by a basic structure as disclosed herein.

In an embodiment, the wave power system is as the wave power device described in US2020088155 with the modification that both the substantially stationary member and the pressure pipe(s) as described in US2020088155 are replaced by a basic structure as disclosed herein.

In an embodiment, the row of duct sections has a first and a second end and the first end is connected to a first terminating arrangement and the second end is connected to a second terminating arrangement. Advantageously, at least one of the first and the second terminating arrangements comprises a transfer pipeline arrangement for transferring the pumped water to the turbine generator.

In an embodiment, one of the first terminating arrangement and the second terminating arrangement is a closed end duct section.

In an embodiment, the waver power system comprises two or more rows of duct sections connected to a common manifold for transferring the pumped water to the turbine generator.

In a desired embodiment, the wave power system comprises a plurality of interconnected modules, wherein each module comprises a main duct section or a main duct section assembly of two or more duct sections, an associated effector and a transmission arrangement. The main duct section or main duct section assembly may conveniently have a length of from 5 to 20 m and comprises an inlet opening into the bore of the duct sections wherein the inlet opening is in fluidic communication with the transmission arrangement. The transmission arrangement may be adapted for converting the relative movement of the associated effector into pumping of water into the bore of the main duct section or main duct section assembly via the inlet.

By providing the wave power system with a plurality of interconnected modules, the wave power system may be designed to have a desired size. In addition, the wave power system may be enlarged or reduced even after installation.

Further, it makes it very simple to replace defective elements of the system.

In an embodiment, the main duct section assembly comprises an intermediate duct section having a length of 2 m or less and wherein the inlet is located at the intermediate duct section.

In an embodiment, the transmission arrangement comprises at least one hydraulic ram directly or indirectly connected to the basic structure and directly or indirectly connected to the at least one effector, preferably the wave power system comprises at least one, such as one or two transmission arrangements for each effector.

In an embodiment, at least two of the releasable connected duct sections are rotatable connected to each other. Advantageously, each of a plurality of the releasable connected duct sections are rotatable connected to at least one other of the duct sections.

It has been found that by providing that the duct sections are rotatable connected with adjacent duct sections the risk of build-up of localized stresses in the system may be reduced or even avoided.

As described above the basic structure comprising the interconnected duct sections may be rather large and may be subjected to large forces. By some or all the duct sections to be rotatable interconnected, the basic structure may withstand even higher forces without being damage. In addition, it may be possible to build the basic structure even larger, e.g. by adding addition duct sections and effectors to the wave power system.

The rotatable connections may be fully rotatable (360°) or it may be semi rotatable, such as rotatable up to 350°, such as from 45° to 300°, such as from 90° to 180°.

Advantageously, the at least two rotatable connected duct sections are interconnected to enabling relative rotation around an axis parallel to the center axis of at least one of the duct sections, such as around the center axis.

The at least two rotatable connected duct sections are advantageously interconnected via a swivel joint, such as a swivel joint located between and interconnecting the at least two rotatable connected duct sections. Swivel joint as such are well-known and suitable swivel joints may for example be a swivel coupling as marketed by W. E. Couplings Ltd or of the type of swivel joints marketed by Rotaflow FV Ltd.

Depending on the waters in which the wave power system is to be deployed, wave action may result in unwanted twisting of the basic structure. To prevent damage, the basic structure may comprise one or more swivel joints, allowing different subsections to swivel relatively to each other without compromising the mechanical integrity of the basic structure.

The swivel joints may be designed such that a duct section is present on the axis of rotation.

In an embodiment, the at least two rotatable connected duct sections are directly interconnected by respective male end portions and female end portions mated to each other. A bearing for rotatable connection may be mounted within the direct connection, such as a ball bearing or a roller bearing.

In an embodiment, the at least two rotatable connected duct sections are interconnected via transitional holding ring optionally via a bearing.

A sealing may conveniently be located at the interconnection of the rotatable interconnected duct sections, to reduce or prevent leaking water.

In an embodiment, the duct sections are housing a pressure pipe for transporting of water. T the pressure pipe may conveniently be a polymer pipe, optionally a fiber reinforced polymer pipe. The pipe may advantageously be a flexible pipe. Thus, the pressure pipe may be pulled into the duct sections after they have been connected to each other.

The pressure pipe may be simple to replace in case of undesired leakage. Thereby the lifetime of the wave power system may be prolonged.

The energy harvesting arrangement is advantageously arranged for harvesting energy from relative horizontal movements between the energy collector and the basic structure. In an embodiment, the energy harvesting arrangement is arranged for harvesting energy exclusively from non-rotational movements.

All features of the invention(s) and embodiments thereof including ranges and preferred ranges can be combined in various ways within the scope of the invention, unless there are specific reasons not to combine such features.

BRIEF DESCRIPTION OF THE EXAMPLES AND DRAWING

The invention will be illustrated further below in connection with examples and embodiments and with reference to the figures. The figures are schematic and may not be drawn to scale. The examples and embodiments are merely given to illustrate the invention and should not be interpreted to limit the scope of the invention.

Figure 1:
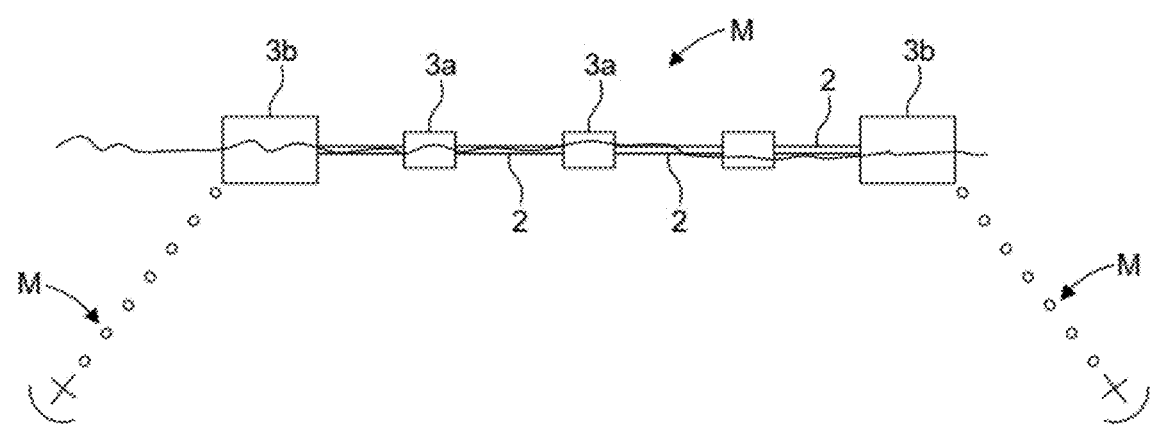
FIG. 1 is a schematic illustration of a wave power system according to an embodiment of the invention where the effector is not shown.

The wave power system of FIG. 1 comprises a basic structure 1 made from a plurality of duct sections 2 releasable connected to each other. A number of buoyancy elements 3a, 3b are connected to hold the basic structure floating at a desired water level as described above. The buoyancy elements 3a, 3b comprises buoyancy elements 3b mounted to the basic structure 1 at respective ends thereof and buoyancy elements 3a mounted to the basic structure 1 at selected locations along the basic structure, such as one buoyancy element 3a to each duct section 2. The buoyancy elements 3b located at the respective ends of the basic structure may as illustrated advantageously be larger (I.e. have a larger buoyancy effect) than the buoyancy elements 3a mounted to the basic structure 1 at selected locations along the basic structure. The wave power system comprises a plurality of not shown effectors.

The basic structure is moored by mooring lines M at its respective ends. The mooring ensures that the wave power system remains at the desired location. The waves will move the plurality of effectors relative and essentially parallel to the basic structure in pendular movements, which are offset, such that the overall load applied to the basic structure by the movements of the effectors are relatively low.

Figure 2:
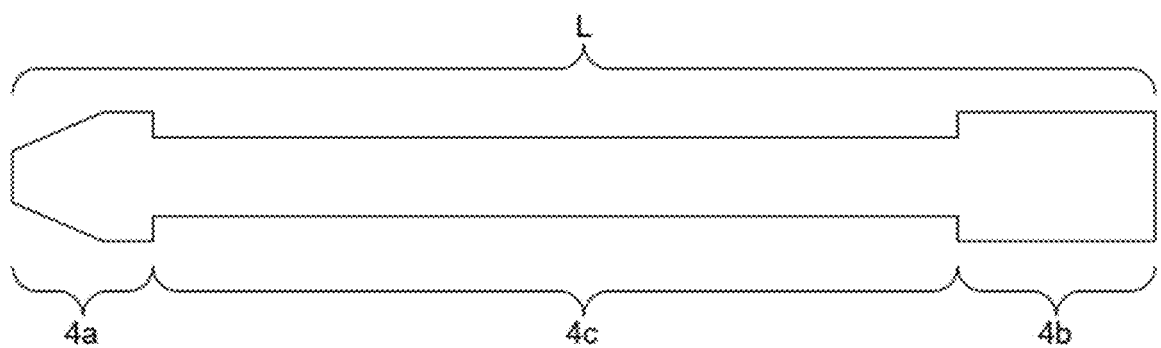
FIG. 2 illustrates a duct section suitable for a wave power system according to an embodiment of the invention.

The duct sections illustrated in FIG. 2 has a length L with a first end portion 4a and a second end portion 4b. In this example, the first end portion 4a is a male portion and the second end portion 4b is a female portion. As indicated, the wall thickness at the end sections 4a, 4b beneficially has a larger maximal wall thickness than the intermediate length section 4c. This ensures a desirable high strength of the resulting basic structure. In addition, the respective end sections 4a, 4b may comprise respective threads for easy and safe connection and decoupling.

Figure 3:
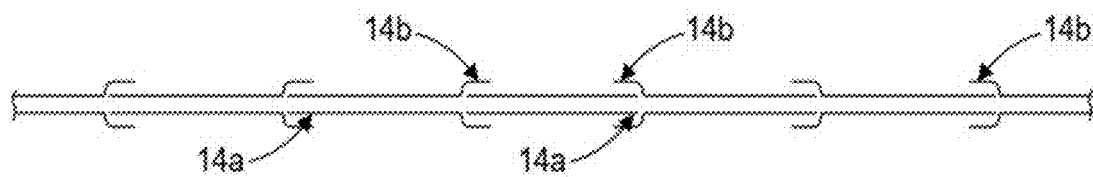
FIG. 3 illustrates a plurality of releasable connected duct sections suitable for a wave power system according to an embodiment of the invention.

In FIG. 3, a number of interconnected duct sections are illustrated. As shown each duct section comprises a first and a second end connection. Some of the duct sections comprises a male end section 14a and a female section 14b and one of the illustrated duct section has two male sections 14a.

Figure 4A:
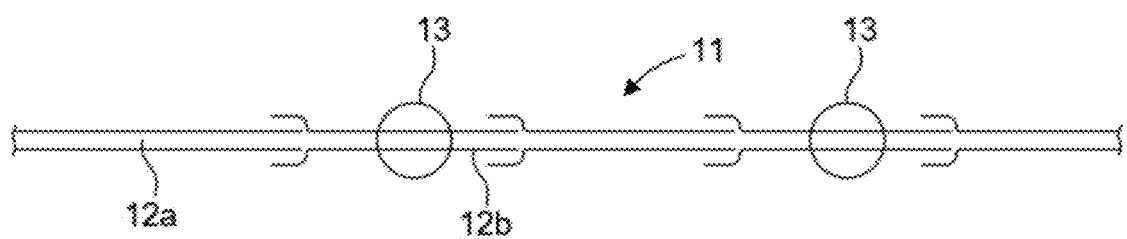
FIGS. 4a-4c are schematic illustrations of a part of a wave power system according to an embodiment of the invention.

FIG. 4a shows a part of a wave power system comprising a portion of the basic structure 11 comprising a number of interconnected duct sections 12a, 12b, which may also be referred to a main duct sections as disclosed herein. A buoyancy element 13 is connected to every second of the duct sections 12b.

Figure 4B:
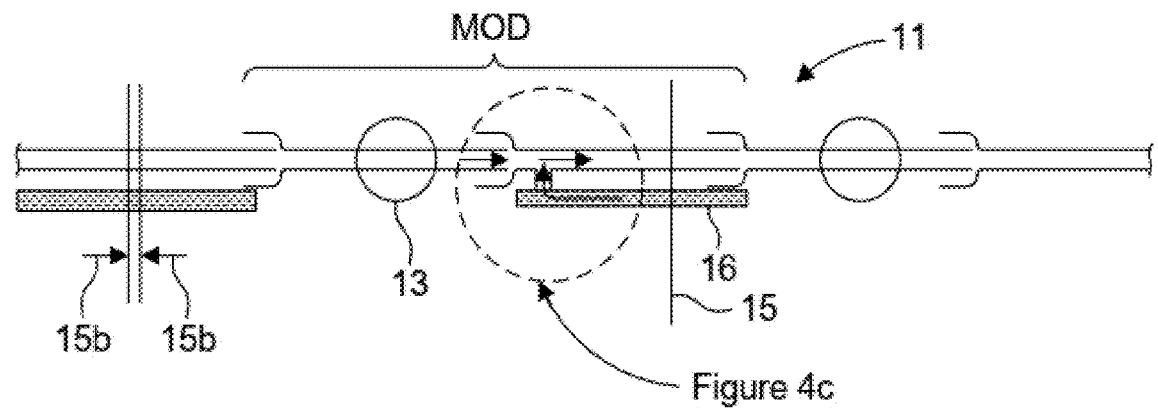

FIG. 4b an effector 15 and a transmission arrangement 16 has been mounted to the every second of the duct sections 2a i.e. the duct sections to which the buoyancy elements are not attached. As it is seen in FIG. 4c, the duct sections to which an effector 15 and a transmission arrangement 16 is mounted are inlet duct sections comprising an inlet opening 12c.

The effectors 15 comprises each an effector flange having opposite surfaces 15a as described above. The transmission arrangement 16 is connected to the inlet duct sections 12a and the effector is connected to the transmission arrangement.

The wave power system thereby comprises a plurality of modules MOD comprising a first module part comprising an inlet duct section 12a together with a transmission arrangement 6 and an effector 15 and a second module part comprising a duct section 12b together with a buoyancy element 13 mounted thereto.

Figure 4C:
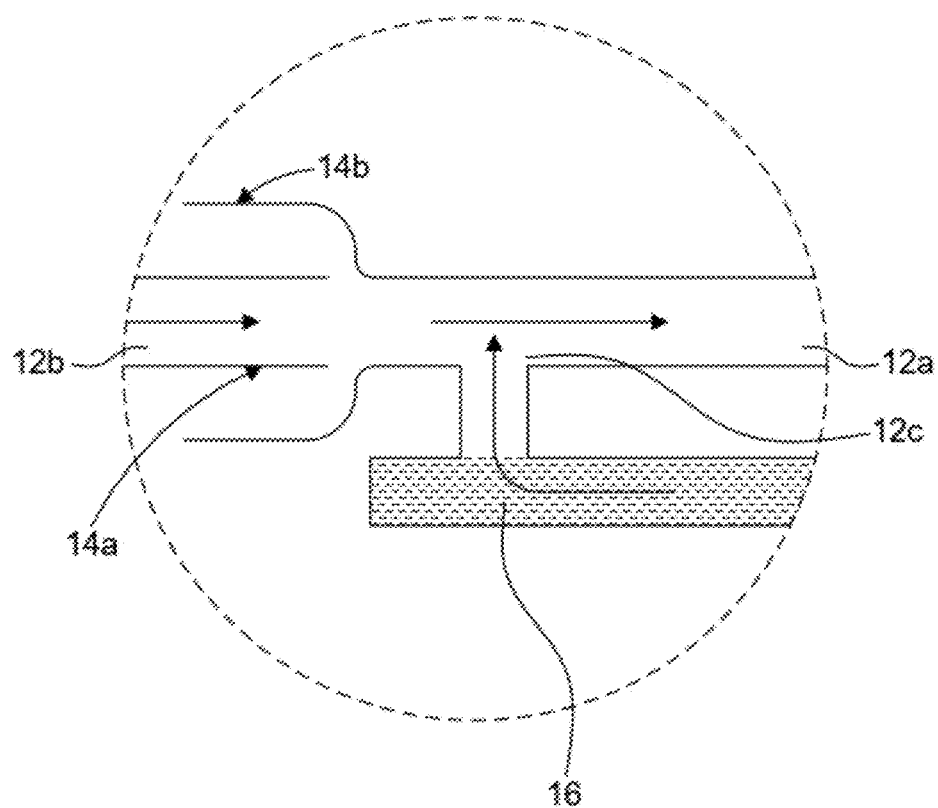
Figure 5A:
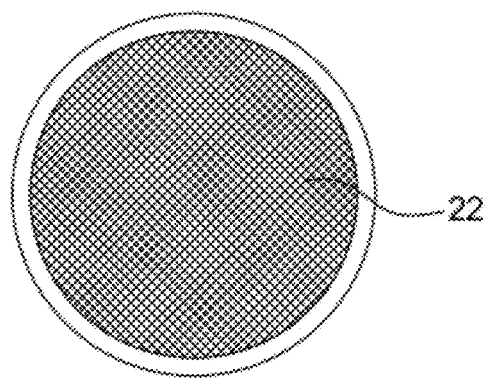
FIG. 5a is a cross sectional view of a basic structure of a wave power system according to an embodiment of the invention where the cross section is provided at a location without transmission arrangement and effector.

FIG. 4c shows an enlargement of a part of the module MOD. Here it can be seen that the inlet duct section 12a comprises an inlet opening 12c and that the transmission arrangement 16 is coupled to the inlet duct section 12a to pump water into the basic structure 11 via said inlet opening 12c. The duct sections 12a, 12b of the module MOD are connected to each other via respectively a male end section 14a and a female end section 14b FIG. 5a shows a cross sectional view of a duct section 22 basic structure of a wave power system taken at a location without transmission arrangement and effector. As illustrated, the duct section 22 of the basic structure has a desired wall thickness to ensure high strength and at the same time provide a desired weight of the basic structure.

Figure 5B:
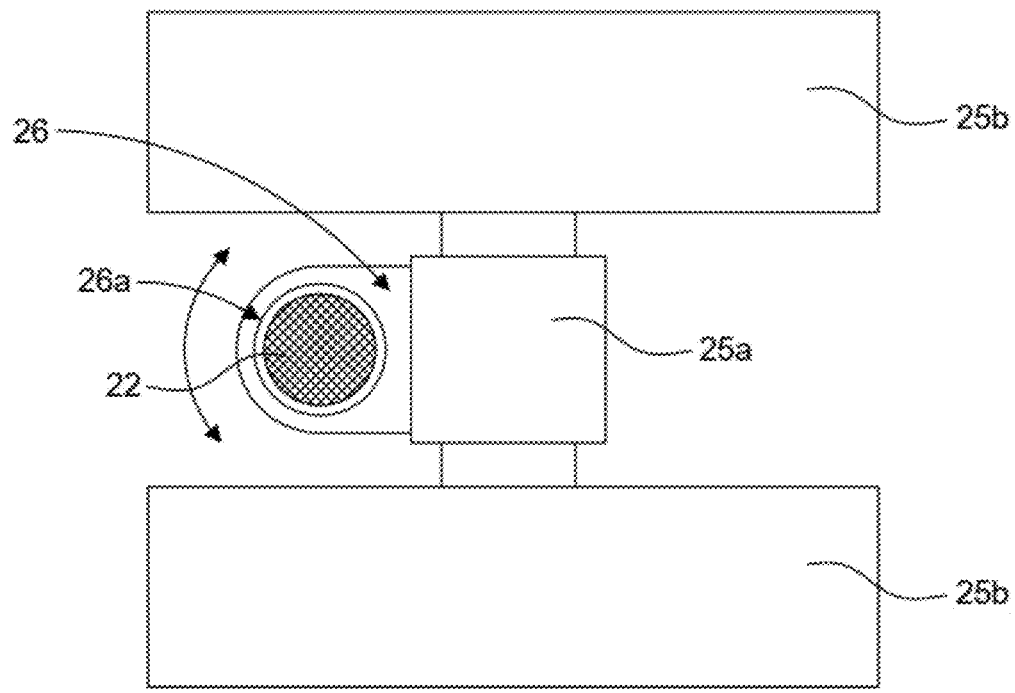
FIG. 5b is another cross sectional view of the basic structure of the wave power system according to the embodiment of FIG. 5a, where the cross section is provided at a location comprising a transmission arrangement and an effector.

In FIG. 5b a cross sectional view of the duct section 22 of the basic structure at a location comprising a transmission arrangement 26, an effector 25b and a connecting element 25a connecting the transmission arrangement 26 to the effector 25b are shown. The effector 25b is mounted to the transmission arrangement 26 by the connecting element 25a. The transmission arrangement 26 has a through opening through which the duct sections 22 is mounted. The bearing between the transmission arrangement 26 and the duct section 22 allows the transmission arrangement 26, the connecting element 25a and the effector 25b to rotate relative to the duct section 22 and preferably to move the effector 25b lengthwise relative to the duct section 22. The bearing may advantageously be a ball bearing, a roller bearing, a sliding bearing or similar.

Figure 6:
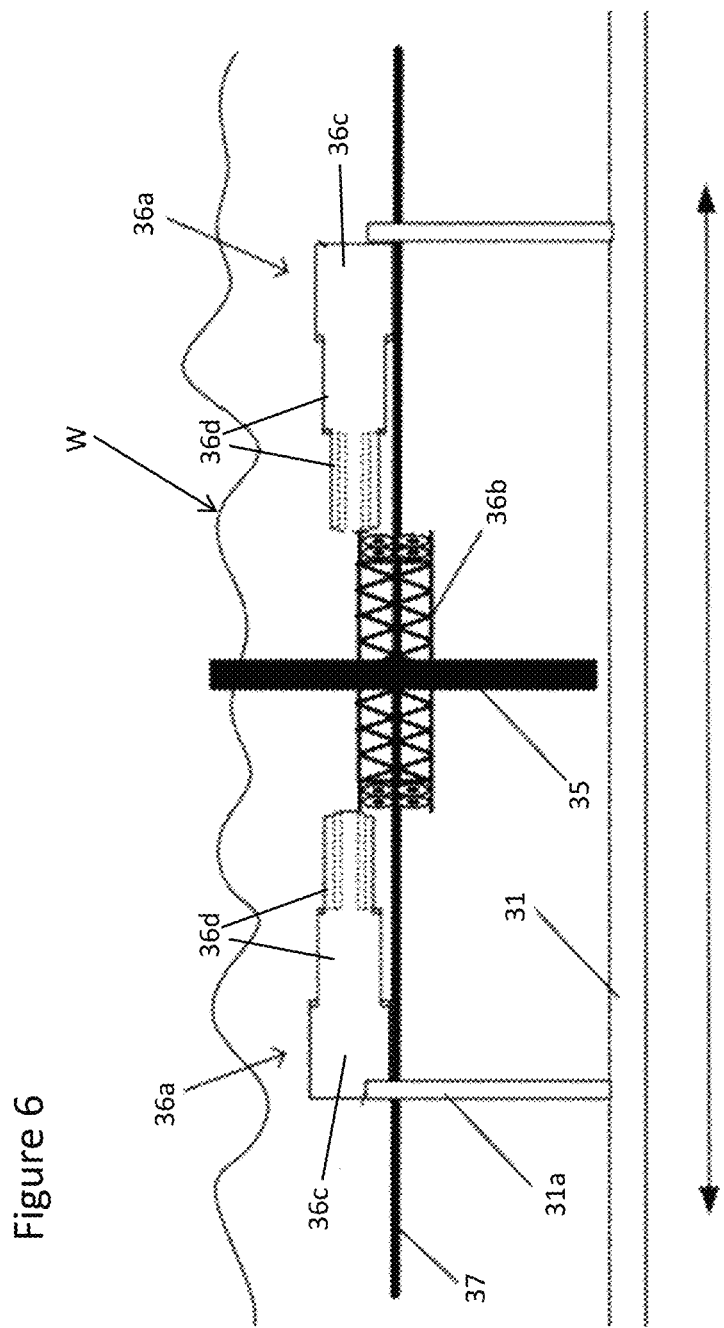
FIG. 6 illustrates a wave power system according to an embodiment of the invention comprising an additional support string.

FIG. 6 illustrates a module section of a wave power system comprising a basic structure 31 comprising a plurality of duct sections releasable connected to each other as disclosed herein. The basic structure 31 comprises a pair of branch pipe sections 31a connected to inlet openings of duct sections of the basic structure 31. The branch pipe sections 31a are connected to a transmission arrangement 36a, 36b. The transmission arrangement 36a, 36b is connected to the effector 35.

The wave power system of this embodiment comprises an additional support string (37) connected to support the transmission arrangement 36a, 36b and the effector 35. The additional support string may for example be a wire, such as a steel wire. The transmission arrangement 36a, 36b comprises a stabilizer 36b and hydraulic rams 36a arranged on either side of the stabilizer 36b. The effector 35 is mounted to the stabilizer 36b. Each of the hydraulic rams 36a comprises a number of hydraulic sections comprising a main hydraulic section 36c, which are mounted to the branch pipe section 31a, and a number of displaceable hydraulic sections 36d, which are displaceable into the main hydraulic sections 36c for pumping water into the basic structure 31 via the branch pipe section 31a. The stabilizer 36b is fixed to an outermost of the hydraulic sections 36d of each of the hydraulic rams 36a to stabilize the movements of the effector 35 as it moves forth and back. The stabilizer 36b is moved together with the effector 35, and transfer the pumping effect to the hydraulic rams 36a, which thereby pumps water into the duct sections of the basic structure 31. The waterline is illustrated with "W".

Figure 7:
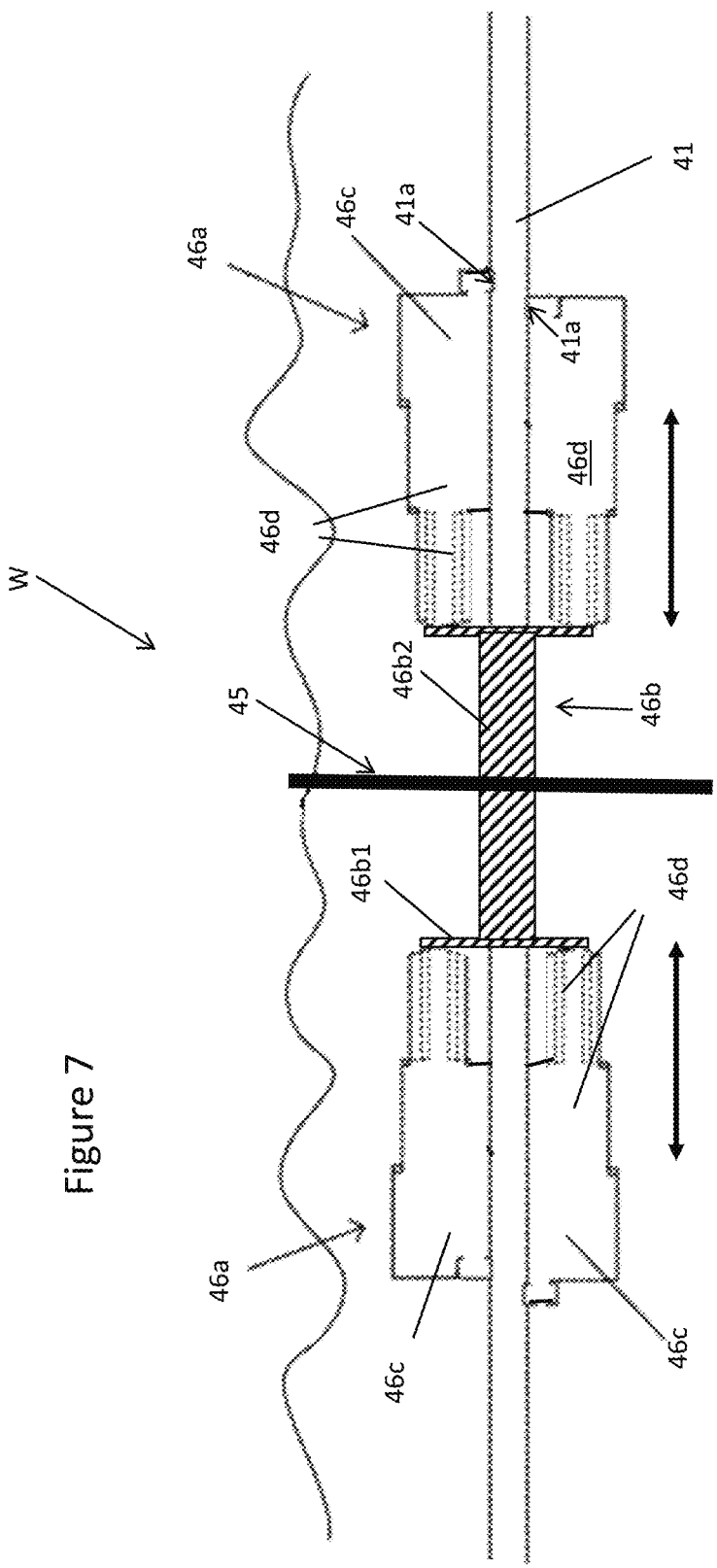
FIG. 7 illustrates a wave power system according to an embodiment of the invention.

FIG. 7 illustrates a module section of a wave power system comprising a basic structure 41 comprising a plurality of duct sections releasable connected to each other as disclosed herein. The basic structure 41 has a number of inlet openings 41a and a transmission arrangement 46a, 46b is connected to the basic structure 41 for feeding water directly into the duct sections of the basic structure 41. The transmission arrangement 46a, 46b is connected to the effector 45.

The transmission arrangement 46a, 46b comprises a stabilizer 46b and pairs of hydraulic rams 46a arranged on either side of the stabilizer 46b. The effector 45 is mounted to the stabilizer 46b. Each of the hydraulic rams 46a comprises a number of hydraulic sections comprising a main hydraulic section 46c, and a number of displaceable hydraulic sections 46d, which are displaceable into the main hydraulic sections 46c for pumping water into the basic structure 41. The stabilizer 46b is fixed to an outermost of the hydraulic sections 46d of each of the hydraulic rams 46a of the pair of hydraulic rams to stabilize the movements of the effector 45 as it moves forth and back. The stabilizer 46b comprises a flange 46b1 for connection to the hydraulic rams 46a and a body portion 46b2, with a bearing between the basic structure body portion 46b2 which allows the stabilizer 46b to moved together with the effector 45, and transfer the pumping effect to the hydraulic rams 46a, which thereby pumps water into the duct sections of the basic structure 41. The bearing may e.g. be a ball bearing or a roller bearing as disclosed herein. The waterline is illustrated with "W".

Figure 8:
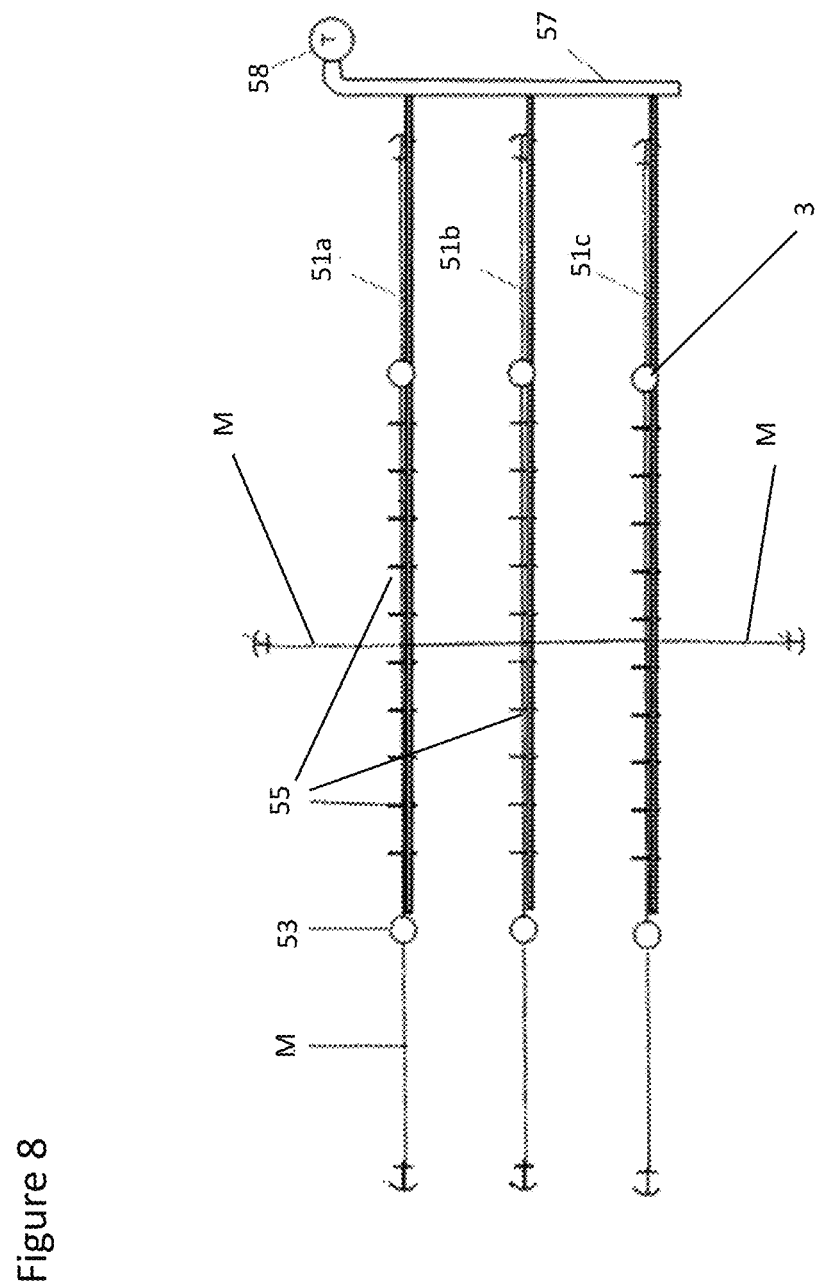
FIG. 8 is a schematic illustration of a wave power system according to an embodiment of the invention comprising several rows of duct sections connected to a common manifold.

FIG. 8 show a wave power system comprising three rows of duct sections 51a, 51b, 51c connected to a terminating arrangement comprising a common manifold 57 for transferring the pumped water to the turbine generator 58. Each of duct sections 51a, 51b, 51c comprising a plurality of duct sections releasable connected to each other as disclosed herein and wherein a number of effectors 55 and not shown transmission arrangement are mounted to the respective rows of duct sections 51a, 51b, 51c as disclosed herein. The rows of duct sections 51a, 51b, 51c are moored by mooring lines M. The of duct sections 51a, 51b, 51c further comprises a number of buoyancy elements 53, where only a representative number of these are shown.

Figure 9A:
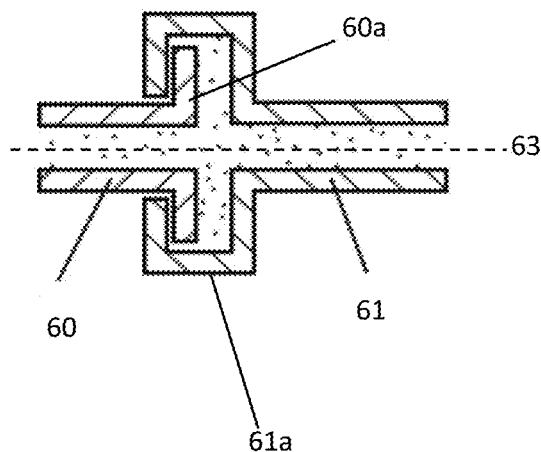
FIGS. 9a-9e show examples of rotatable connections of duct sections.

The rotatable connections of duct sections shown in FIG. 9a is a direct connection between a first and a second duct sections 60, 61 are directly interconnected by respective male end portions and female end portions mated to each other.

The female end portion of the first duct section 60 comprising an outwardly stretching flange 60a and the second duct section comprises a cradle 61a for engaging with the outwardly stretching flange 60a. A not shown bearing may be located between the outwardly stretching flange 60a and the cradle 61a.

The outwardly stretching flange 60a interacts mechanically with the cradle 61a thus interlocking the first and the second duct sections 60, 61 in the axial direction, while at the same time enabling relative rotation around a center axis 63 of the duct sections 60, 61 and/or around an axis parallel to the center axis 63 of the duct sections 60, 61. Pressurized water may be transported along the center axis 63 through the interconnected duct sections 60, 61. The duct sections 60, 61 may be pre-tensioned along the center axis 63 and/or a sealing may be provided to ensure a sufficiently tight bond that leaks little or no water.

In a variation of the embodiment of FIG. 9a, the cradle 61a has a curved cradle depth and mating to a convex top surface of the outwardly stretching flange 60a, thereby forming a ball joint which allows the first and the second duct sections 60, 61 to bend relative to each other, thereby preventing or reducing transfer of bending moments along the basic structure.

Figure 9B:
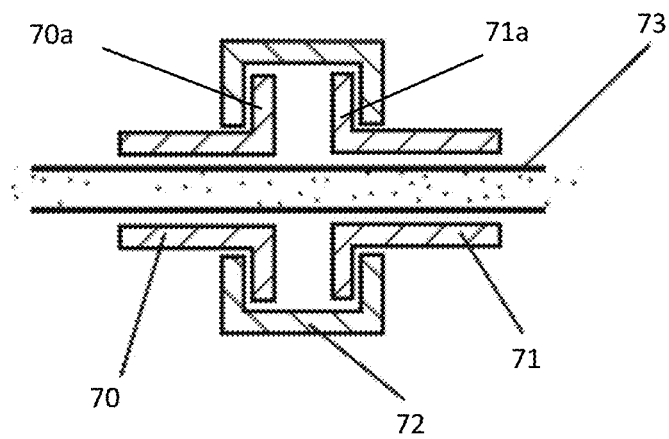

The rotatable connections of duct sections shown in FIG. 9b is an interconnection between a first and a second duct sections 70, 71 via a transitional holding ring 72.

The first and the second duct sections 70, 71 are interconnected via respective outwardly stretching flanges 70a, 71a located at their respective male end portion. The transitional holding ring 72 forms a cradle that holds the outwardly stretching flanges 70a, 71a together, while allow relative rotation of the first and the second duct sections 70, 71. A not shown bearing may be located between the respective outwardly stretching flanges 70a, 71a.

A pressure pipe 73 for transportation of the water is housed in the interconnected duct sections 70, 71. Thereby the connections between the duct sections 70, 71 need not being water tight. In the alternative, the duct sections 70, 71 may be pre-tensioned along their center axis and/or a sealing may be provided to ensure a sufficiently tight bond that leaks little or no water.

The element transitional holding ring 72 may be made from two half shells which are clamped around the pipe ends, hereby ensuring a safe locking of the duct sections 70, 71 against relative motions along the center axis, while at the same time allowing the connected duct sections 70, 71 to rotate relatively to each other.

Figure 9C:
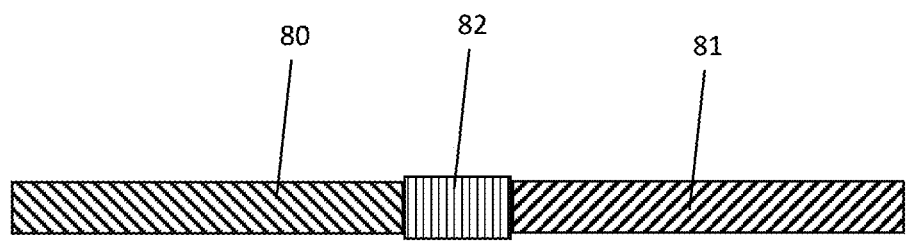
Figure 9D:
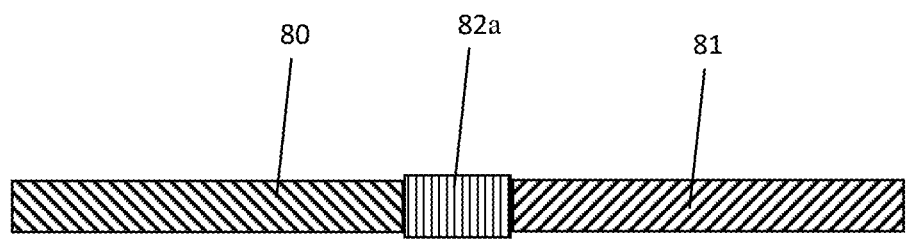
Figure 9E:
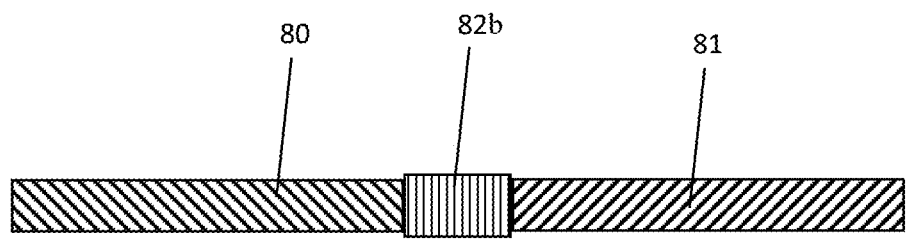

The rotatable connections of duct sections shown in FIG. 9c is an interconnection between a first and a second duct sections 80, 81 via a swivel joint 82 located between and interconnecting the first and the second duct sections 80, 81. FIG. 9d shows a similar configuration, in which numeral 82a refers to a schematic representation of a clamp connecting the duct sections 80, 81 together. FIG. 9e shows a similar configuration, in which numeral 82b refers to a schematic representation of an element with screw threads connecting the duct sections 80, 81 together.

The invention claimed is:

1. A wave power system for extracting energy from water waves, the wave power system comprising:
- a stationary basic structure forming a framework, and comprising a plurality of duct sections,
- at least one effector comprising surfaces that are configured to be impacted by water waves to cause the at least one effector to move relative to said stationary basic structure, and
- an energy harvesting arrangement configured for harvesting energy generated from said relative movements between said at least one effector and said stationary basic structure,
- wherein the plurality of duct sections:
  - (i) comprise releasable end-to-end connections to each other to form a row of releasably connected duct sections, and
  - (ii) comprise main duct sections, each main duct section having a respective associated effector of the at least one effector, each associated effector being configured for being moved lengthwise relative to the main duct sections.

2. The wave power system of claim 1, wherein said releasably connected duct sections are releasably connected to each other by clamps or screw threads.

3. The wave power system of claim 1, wherein the duct sections are made from steel, aluminum, titanium, fibre composite or any combination comprising one or more of these.

4. The wave power system of claim 1, wherein the at least one effector is configured for being moved by the horizontal component of the water waves and wherein the energy harvesting arrangement is configured for converting the energy to electricity, heat or pressurized fluid.

5. The wave power system of claim 1, wherein the energy harvesting arrangement comprises a turbine generator comprising a hydraulic turbine and said energy harvesting arrangement comprises a transmission arrangement arranged for pumping fluid to drive said hydraulic turbine, wherein the transmission arrangement is located to generate pump power for pumping fluid by the relative movement between said at least one effector and said stationary basic structure.

6. The wave power system of claim 5, wherein respective effectors are connected with respective transmission arrangements for transmitting said relative movement of said respective effectors to pumping of water into the bore of the row of duct sections.

7. The wave power system of claim 1, wherein the plurality of duct sections further comprises intermediate duct sections, wherein the intermediate duct sections have lengths which are 50% or less of the longest of the main duct sections, wherein the intermediate length sections have a length of from about 15 cm to about 2 m.

8. The wave power system of claim 1, wherein the at least one effector comprises a least three effectors wherein each effector is associated to a respective one of said duct sections for being moved parallel to said associated duct section, wherein said associated duct section is a straight duct section.

9. The wave power system of claim 1, wherein a number of said duct sections are inlet duct sections and comprise an inlet opening into the bore of the duct wherein the inlet opening is in fluidic communication with a transmission arrangement adapted for transmitting said relative movement of said at least one effector to pumping of water into the bore of said respective inlet duct sections via said respective inlets.

10. The wave power system of claim 1, wherein the wave power system comprises a plurality of interconnected modules, wherein each module comprises a main duct section or a main duct section assembly of two or more duct sections, an associated effector of the at least one effector and a transmission arrangement, wherein the main duct section or main duct section assembly has a length of from 5 to 20 m and comprises an inlet opening into the bore of the duct sections wherein the inlet opening is in fluidic communication with the transmission arrangement which is adapted for transmitting the relative movement of the associated effector to pumping of water into the bore of said main duct section or main duct section assembly via said inlet.

11. The wave power system of claim 10, wherein the main duct section assembly comprises an intermediate duct section having a length of 2 m or less and wherein said inlet is located at said intermediate duct section.

12. The wave power system of claim 1, wherein at least two of said releasably connected duct sections are rotatably connected to each other, and wherein said at least two rotatable connected duct sections are interconnected via a swivel joint.

13. The wave power system of claim 1, wherein said plurality of duct sections house a pressure pipe for transporting of water.

14. The wave power system of claim 1, wherein the basic structure is configured to float.

15. The wave power system of claim 1, comprising at least one buoyancy element attached to the basic structure.

16. The wave power system of claim 1, wherein two of the plurality of duct sections include respective male and female end portions configured to releasably connect the two duct sections.

17. The wave power system of claim 16, wherein each of said respective male end portions and female end portions comprises a threaded section, wherein said respective duct sections have a minimum wall thickness at said threaded sections of said end portions, which is equal to or larger than the average thickness of the respective duct sections.

18. The wave power system of claim 1, wherein the plurality of duct sections are straight duct sections.

19. The wave power system of claim 18, wherein the straight duct sections comprise directly connected straight duct sections, and wherein the stationary basic structure comprises one or more intermediate duct sections.

20. The wave power system of claim 1, wherein the basic structure has a length of at least 50 m.

21. The wave power system of claim 1, comprising a plurality of interconnected modules, wherein each module comprises a main duct section of the plurality of duct sections or a main duct section assembly of two or more duct sections of the plurality of duct sections, an associated effector of the at least one effector and a transmission arrangement.

22. The wave power system of claim 21, wherein the basic structure is partly or fully buoyant and wherein the wave power system comprises a plurality of buoyancy elements, wherein each main duct section is attached to at least one of the buoyancy elements.

23. A water installation comprising the wave power system of claim 1, wherein the stationary basic structure is partly or fully buoyant and wherein the wave power system comprises a plurality of adjustable buoyancy elements, wherein the adjustable buoyancy elements are adjustable to hold the basic structure floating at water level and to sink the basic structure below water level once the duct sections are fully or partly filled with water.

24. The wave installation of claim 23, wherein at least every second of the duct sections of the row of duct sections is attached to at least one of the adjustable buoyancy elements.

25. The wave installation of claim 23, wherein each of a plurality of the duct sections of the row of duct sections is attached to at least one of the adjustable buoyancy elements.

26. A wave power system for extracting energy from water waves, the wave power system comprising:
- a stationary basic structure forming a framework of the wave power system, and comprising a plurality of duct sections releasably connected to each other,
- at least one effector comprising surfaces that are configured to be impacted by water waves to cause the at least one effector to move relative to said basic structure, wherein the at least one effector is movable relative to said stationary basic structure, and
- an energy harvesting arrangement configured for harvesting energy generated from relative movements between said at least one effector energy collector and said stationary basic structure,
- wherein said energy harvesting arrangement comprises a turbine generator comprising a hydraulic turbine and said energy harvesting arrangement comprises a transmission arrangement arranged for pumping fluid to drive said hydraulic turbine, wherein the transmission arrangement is located to generate pump power for pumping fluid by the relative movement between said at least one effector and said stationary basic structure, wherein the duct sections of the plurality of duct sections are connected end-to-end to each other to form a row of connected duct sections, comprising main duct sections with respective associated effectors of the at least one effector, the respective associated effectors being configured for being moved lengthwise relative to the main duct sections.

* * * * *